March 29, 1966 P. A. LA VIOLETTE, JR 3,242,606
ACTION-BAR CONNECTION FOR FIREARMS
Filed July 1, 1965 2 Sheets-Sheet 2
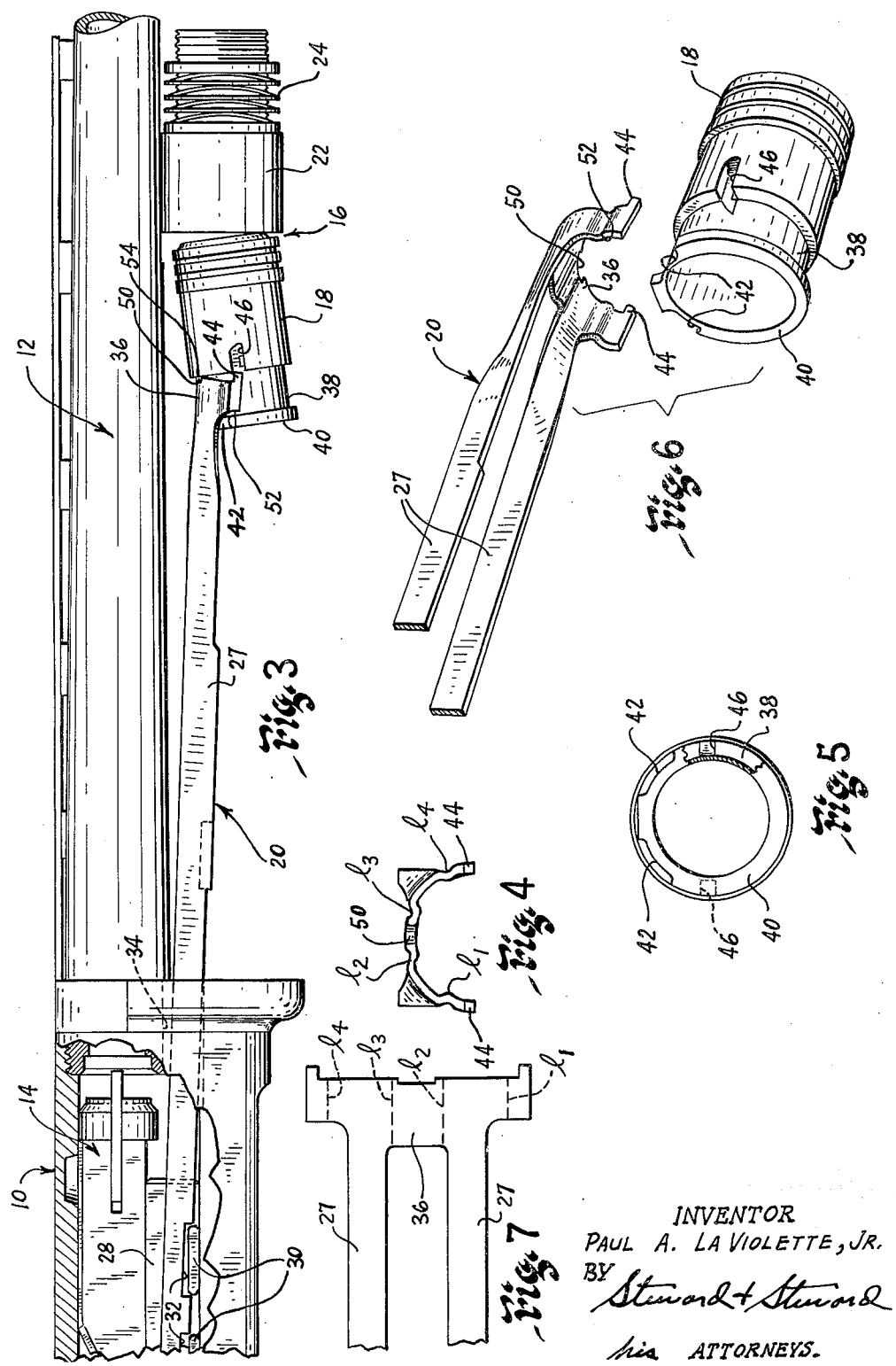
INVENTOR
PAUL A. LA VIOLETTE, JR.
BY
Steward + Steward
his ATTORNEYS.

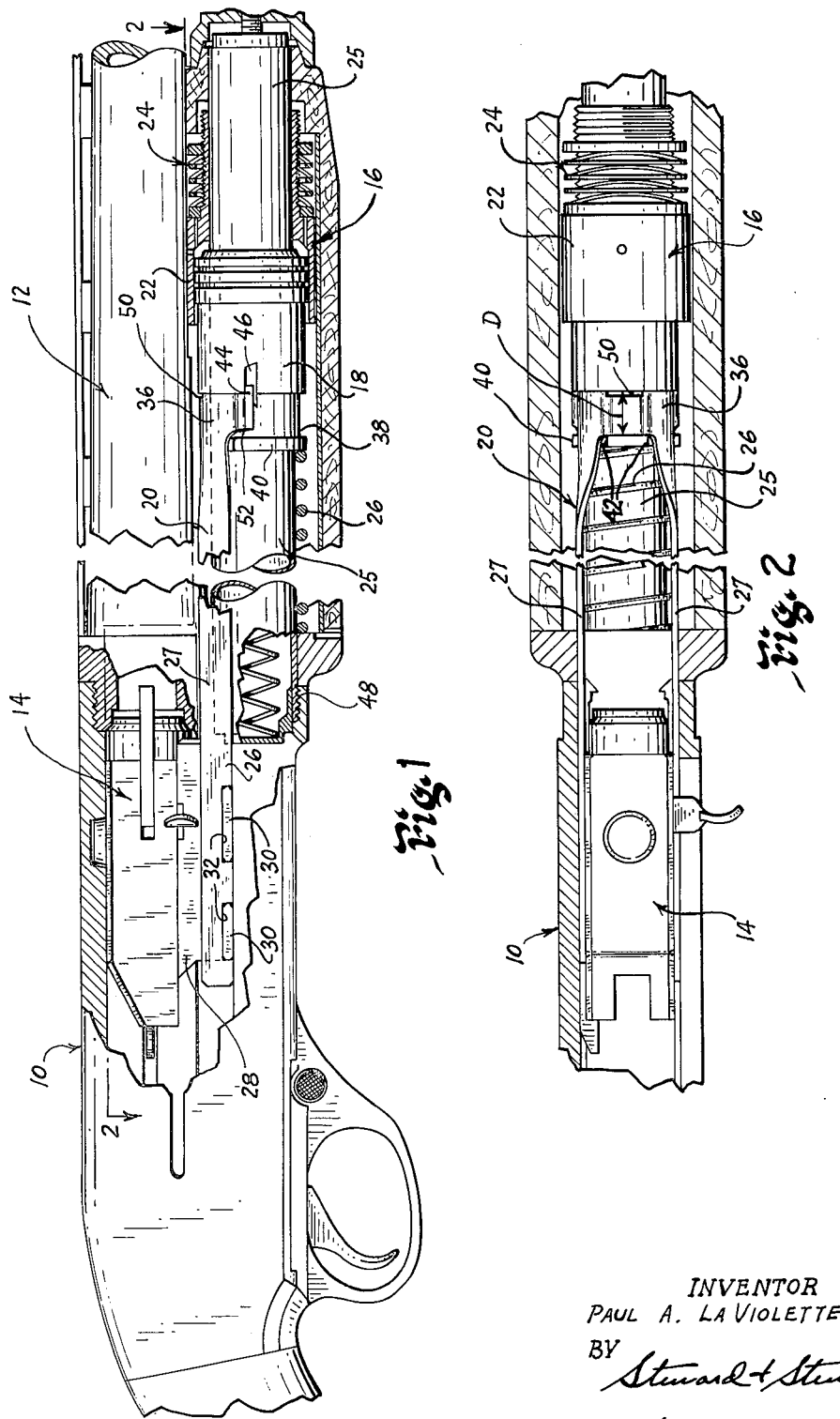

United States Patent Office 3,242,606
Patented Mar. 29, 1966

3,242,606
ACTION-BAR CONNECTION FOR FIREARMS
Paul A. La Violette, Jr., Hamden, Conn., assignor to The High Standard Manufacturing Corporation, Hamden, Conn., a corporation of Connecticut
Filed July 1, 1965, Ser. No. 468,799
4 Claims. (Cl. 42—17)

This invention relates to firearms, and it relates more particularly to firearms which employ action-bars to connect the bolt mechanism of the gun with means for actuating the bolt, such as the gas piston in a gas-operated gun or the forearm of a pump gun.

An object of the invention is to provide an inexpensive, yet reliable means for readily connecting the action-bar to such bolt-actuating means.

Difficulty has been experienced heretofore in making a satisfactory connection between the action-bar and piston in a gas-operated gun of the type which employs a gas cylinder located along the barrel of the gun a desired distance forward of the receiver. Severe forces are repeatedly exerted on this connection in firing the gun. Moreover, the space available for such a connection between the piston and the barrel of the gun is usually extremely limited. A completely satisfactory connection between the action-bar and piston has therefore been a problem heretofore.

An improved connection is obtained in accordance with the present invention by providing the action-bar with a yoke portion which straddles the gas piston, such yoke portion fitting closely within a transverse groove in the piston so that the action-bar and piston move longitudinally as a unit. The action-bar is prevented from lifting out of the groove on the piston by a pair of locking fingers projecting longitudinally from opposite ends of the yoke portion into corresponding recesses in the piston.

In order to disassemble the action-bar from the piston, they are first tilted with respect to each other so that as the yoke portion of the action-bar pivots out of the groove in the piston, its locking fingers retract from locking engagement with the locking recesses. Either the action-bar or piston can then be disengaged from the other laterally. When completely assembled, however, means for preventing tilting of the action-bar and piston is provided, so that they are positively locked together. Thus, for example, the piston may slide on a guide rod or similar guide means so that it cannot tilt with respect to its path of movement in which it is constrained by such guide means. In order to make the action-bar readily removable from the piston after the guide-means for the piston has been removed, while at the same time provide a suitable connected between these members when the gun is assembled, it is important to properly proportion the dimensions of the groove and locking recesses in the piston with those of the yoke member and locking fingers on the action-bar. This will become more apparent from the description hereinafter of one particular embodiment of the invention.

While reference is made hereinabove and in the specific description which follows to gas-operated firearms, it is apparent that, if desired, the type of connection embodying the present invention can also be used in other kinds of guns which employ action-bars, such as in pump-action guns for connecting the action-bar to the manually operated forearm.

Referring now to the accompanying drawings:

FIG. 1 is a side elevational view, partly in section and broken away, of the receiver and fore-end portions of a gas-operated gun in which the action-bar connection of the present invention is employed;

FIG. 2 is a longitudinal section taken on the line 2—2 of FIG. 1;

FIG. 3 is a side elevational view of the front end of the receiver and rear portion of the barrel, showing the gun partially disassembled;

FIG. 4 is a front-end view of the action-bar;

FIG. 5 is a rear-end view of the gas piston;

FIG. 6 is a perspective view looking from below of the gas piston and the adjacent end of the action-bar, illustrating how the piston may be disengaged from the action-bar; and FIG. 7 shows a blank from which the action-bar is formed.

The particular gun illustrated in the drawings in which the action-bar connection of the present invention is employed, is a gas-operated shotgun, the receiver of which is indicated generally by the reference numeral 10, the barrel by 12, the bolt mechanism by 14 and the gas cylinder mechanism by 16. A piston 18 of the gas cylinder mechanism 16 is driven rearwardly by the gases of explosion when a cartridge is fired to actuate the bolt mechanism 14 through an action-bar 20, which connects the bolt mechanism 14 with the piston 18.

Gas cylinder mechanism 16 is similar to that shown in the patent to Hillberg 2,909,101, gas being led to the cylinder 22 through ports in the underside of barrel 12. A gas relief and pressure-reducing device 24 is provided at the front-end of the gas cylinder mechanism 16 in order to safeguard against excessive pressure and to provide smoother operation when high-power cartridges are used. Piston 18 is a sleeve-like member which rides on and is positively guided by a magazine tube 25 for movement longitudinally of the gun into and out of cylinder 22. When piston 18 is at the forward limit of its stroke, only the front end of the piston is received within cylinder 22, the trailing skirt portion of the piston, which extends out of open end of the gas cylinder, being connected to the action-bar 20 as will be described hereinafter. Upon firing the gun, piston 18 is driven rearwardly out of cylinder 22 against an action-return spring 26 surrounding magazine tube 25 which drives piston 18 forward again into cylinder 22 on the return stroke.

Bolt mechanism 14, which is substantially identical to that illustrated in the patent to Horsrud 3,213,558, granted on application, Ser. No. 350,631, filed March 4, 1964, is reciprocated by piston 18 within receiver 10 when the gun is automatically reloaded upon firing. Action bar 20 actually consists in this instance of two elongated bars 27 (FIGS. 2 and 6), the rear ends of which straddle slide 28 of bolt mechanism 14 and are connected thereto by means of lugs 30, 30 (FIG. 1) which project laterally from slide 28 into notches 32, 32 in the under edges of bars 27. Bars 27 extend forwardly through slots 34 (FIG. 3) in the front end of receiver 10 and are joined together at their forward ends by a yoke portion 36, which is integral therewith. Yoke 36 fits snugly within a peripheral groove 38 in the skirt of piston 18, thereby connecting the action-bar 20 and piston 18 so that they move together as a unit longitudinally of the gun.

In this instance, action-bar 20 is made from a flat sheet metal blank (FIG. 7) comprising the two longitudinal bars 27 and transverse yoke portion 36 at the forward end thereof. Yoke 36 is bent at four places indicated by the broken lines $1_1$, $1_2$, $1_3$, and $1_4$, which are roughly coextensive with the longitudinal edges of bars 27. Bends $1_1$, $1_2$, $1_3$, and $1_4$ are made so that bars 27 are raised sufficiently, as shown in FIG. 4, to clear the return spring 26 (FIGS. 1 and 2) surrounding magazine tube 25 on which piston 18 is guided, while the center and outer end portions of yoke 36 are arcuately shaped so as to fit flush with the bottom of peripheral groove 38 in piston 18. This greatly simplifies manufacture of the action-bar 20. Just rearward of yoke 36, bars 27 are bent longitudinally, as clearly shown in FIG. 6, so that from there back they stand on edge with their flat sides at their free ends embracing the sides of the slide 28 of bolt mechanism 14.

Groove 38 in piston 18 forms a flange 40 at the rear end thereof. In order to conserve space a pair of notches 42 are provided in flange 40 to receive bars 27 of action-bar 20 at the point at which they join yoke 36. The depth of groove 38 is about equal to the thickness of yoke 36 so that when yoke 36 is fully seated in groove 38, as shown in FIG. 1, its outer surface is substantially flush with the outer surface of piston 18, and the upper edges of bars 27 are substantially in line with the uppermost contour of piston 18.

Since it is difficult, if not impossible, to prevent some vertical movement of action-bar 20, the forward end of said action-bar must be prevented from lifting vertically so that yoke 36 cannot lift out of groove 38, which of course would allow the action-bar to become completely disconnected from the piston. This is prevented in some prior action-bar connections by bending the ends of the yoke into depressions in opposite sides of the piston. However, such a connection is awkward, because it is difficult to force the ends out of the depressions when it is desired to disconnect the piston from the action-bar. In the construction shown in the aforementioned Hillberg patent on the other hand, the connecting finger on the action-bar, which corresponds to the present yoke 36, is disposed so close to the underside of the barrel that the barrel retains it in the slot of the piston. The disadvantage here is that, because the barrel is tapered, it must be cut on the underside in order to maintain the required clearance between it and the action-bar connecting finger. This necessitates another expensive machining operation.

In accordance with the present invention, the yoke 36 of the action-bar is prevented from lifting out of groove 38 in the piston by a pair of locking fingers 44 disposed on the front edge of yoke 36 at opposite ends thereof. Locking fingers 44 project forwardly into a pair of correspondingly spaced recess 46 at opposite, but not necessarily diametrically opposite, sides of piston 18. Recesses 46 extend longitudinally of piston 18 and open into peripheral groove 38 so as to receive locking fingers 44 in the manner shown in FIG. 1. Since yoke 36 fits fairly snugly within groove 38, it is impossible without tilting the action-bar and piston with respect to each other, to move yoke 38 rearwardly far enough to free locking fingers 44 from recesses 46. Action-bar 20 is accordingly positively connected to piston 18 when the gun is fully assembled.

However, as illustrated in FIG. 3, by removing the magazine tube 25, on which piston 18 is positively guided, and sliding piston 18 rearwardly out of gas-operating cylinder 22, the action-bar 20 and piston 18 may then be tilted relative to each other so that locking fingers 44 are withdrawn from the recesses 46. Yoke 36 may then be disengaged from groove 38, and piston 18 can be disconnected from the action-bar. In reassembling these parts they are again tilted enough to permit yoke 36 to fit partially into groove 38 at about the angle indicated in FIG. 3. At this point the action-bar and piston are then straightened up with respect to each other, and in so doing the locking fingers 44 reengage recesses 46. With the action-bar and piston thus aligned, the magazine tube 25 is then replaced by sliding it through cylinder 22 and piston 18 and threading it into a socket 48 in receiver 10. Once magazine tube 25 is in place, piston 18 is prevented from tilting, thereby positively locking the connection between the action-bar and piston.

It will be noted that in the gun here illustrated, the front end of the action-bar is permitted to drop slightly in order to facilitate disassembly of the piston. This is possible without removing the bolt assembly 14 from the receiver. However, if there is enough space between the cylinder 22 and the underside of barrel 12, the piston may be tilted enough by itself without tilting action-bar 20 to permit disassembly of these parts.

In order to provide a close fit between yoke 36 and groove 38 so that the action-bar and piston are tightly connected to each other, a notch 50 is cut in the front edge of yoke 36 centrally between locking fingers 44. Notch 50 allows yoke 36 to tilt within groove 38 even though there is a very close fit between the central part of yoke 36 (see dimension D in FIG. 2) and the width of groove 38. In addition, the back edges of yoke 36 opposite locking fingers 44 are cut away at 52 (FIG. 3) in order to allow such tilting action to take place. The combination of the cutaways 52 and notch 50 permits the back edge of yoke 36 to lift up within groove 38 as the yoke pivots about its front edge at 54 against the forward side of the groove.

A mechanically simple means for connecting the action-bar and piston is thus provided, such connection nevertheless being positive and close-fitting without the need for precise manufacturing tolerances or other high-cost operations.

What is claimed is:

1. In a firearm having a receiver, a reciprocating bolt mechanism housed within said receiver and a barrel extending forwardly from said receiver, a bolt-actuating member supported by said barrel for reciprocal movement longitudinally thereof, an action-bar member connected adjacent one end to said bolt mechanism and adjacent its other end to said bolt-actuating member and removable guide means constraining at least one of said action-bar and bolt-actuating members to said longitudinal movement, the improvement in said connection between said action-bar member and said bolt-actuating member wherein said bolt-actuating member has a groove extending transversely to its direction of movement, said action-bar member having a yoke portion adjacent said other end for engagement within said groove of said bolt-actuating member and a pair of locking fingers projecting from said yoke portion longitudinally of said action-bar member, said locking fingers embracing said bolt-actuating member at opposite sides thereof, said bolt-actuating member having locking recesses extending longitudinally from said groove and disposed so as to receive said locking fingers when said yoke portion is fully engaged within said groove, the dimensions of said groove and locking recesses of said bolt-actuating member and of said yoke portion and locking fingers of said action-bar member being so proportioned relative to each other that said action-bar and bolt-actuating members are positively connected, one to the other, when one of said members is constrained by said guide means, while disassembly of said members is made feasible upon removal of said guide means in order to permit tilting of at least one of said members relative to the other so as to withdraw said locking fingers from said locking recesses.

2. The combination defined in claim 1, wherein said yoke portion fits closely within said groove in order to ensure a tight connection between said action-bar and bolt-actuating members, said yoke portion having a notch located intermediate said locking fingers and in an edge thereof adjacent said locking fingers to permit tilting of said closely fitting yoke portion within said groove when said guide means are removed in order to withdraw said locking fingers from said locking recesses.

3. The combination defined in claim 2, wherein said bolt-actuating member comprises a cylindrical gas piston and said action-bar member includes a pair of elongated bars, said transverse groove being formed peripherally of said gas piston, said yoke portion of said action-bar member forming an arcuate bridge integrally connecting said elongated bars and extending transversely beyond them, said locking fingers being disposed at the ends of said yoke portion and on the edge thereof which faces forwardly of the firearm, the opposite edges of the ends of said yoke portion being cut away to permit tilting of said yoke portion within said groove about its forward edge adjacent said notch.

4. The combination defined in claim 3, wherein said action-bar is formed from a sheet-metal blank with said yoke portion formed to bottom in said groove at least at its ends and at a point adjacent said notch, the parts of said yoke portions disposed longitudinally of said elongated bars being bent outwardly of said groove in order to space said elongated bars outwardly of the bottom of said groove.

No references cited.

BENJAMIN A. BORCHELT, *Primary Examiner.*